United States Patent [19]

Leersnijder

[11] 4,008,813

[45] Feb. 22, 1977

[54] CONVEYING DEVICE FOR CODE SORTING POSTAL ITEMS

[75] Inventor: Carolus Pieter Leersnijder, Heemstede, Netherlands

[73] Assignee: Staat der Nederlanden, Posterijen, Telegrafie en Telefonie, The Hague, Netherlands

[22] Filed: Feb. 6, 1975

[21] Appl. No.: 547,389

[30] Foreign Application Priority Data

Feb. 8, 1974 Netherlands ...................... 7401774

[52] U.S. Cl. ............................. 214/11 R; 198/349; 209/111.5

[51] Int. Cl.[2] ......................................... B65G 43/00

[58] Field of Search .................... 214/11 R, DIG. 1; 209/111.5, 72–73; 198/38

[56] References Cited

UNITED STATES PATENTS

| | | | |
|---|---|---|---|
| 3,075,653 | 1/1963 | Wales et al. | 214/11 R |
| 3,149,736 | 9/1964 | Austin et al. | 214/11 R X |
| 3,519,145 | 7/1970 | MacDonald | 214/11 R |

*Primary Examiner*—Robert J. Spar

*Assistant Examiner*—R. B. Johnson

[57] ABSTRACT

The invention relates to a device for code sorting postal items, comprising a continuously driven and guided main cable conveyor, and one or more feed stations, where postal items are fed to the main conveyor, coded information relative to the destinations of said postal items is recorded in a processor store, and postal items are discharged into a number of discharge positions, in accordance with coded information recorded in the processor store. The main conveyor is provided with separate clamps and holders for engagement and disengagement of a number of cassettes placed at right angles to its direction of movement, each cassette is capable of transporting one postal item in an upright position and having an open top with outwardly extending parallel side flanges, an open end, and a sloping hinged bottom. These cassettes and the main conveyor are provided with means which co-operate to remove cassettes from the main conveyor before they pass the feed station and for re-inserting them into the main conveyor after they have passed it.

5 Claims, 21 Drawing Figures

MANUAL FEEDING STATIONS

AUTOMATIC FEEDING STATION

DISCHARGE STATIONS

MANUAL FEEDING STATION

POSITIONS OF SECOND BELT CONVEYOR OF FIG. 7

CONVEYING DEVICE FOR CODE SORTING POSTAL ITEMS

BACKGROUND OF THE INVENTION

Devices for the code sorting postal items are known which comprise a main conveyor, and one or more feed and discharge stations wherein postal items are fed to the main conveyor and coded information relative to the destinations of said postal items is recorded in a store for controlling a number of discharge positions into which said postal items are discharged in accordance with the coded information recorded in the store. The main conveyor of such device is provided with a number of cassettes placed at right angles to its direction of movement, each of which cassette is capable of transporting one postal item in an upright position.

The conveyor of a known device of this type is complicated, because the cassettes are loaded at the top. Each cassette is provided with four travelling rollers co-operating with four guiding tracks. The cassettes are moved along by two endless chains and, while in motion, have to be loaded with separate postal items, which requires complicated auxiliary equipment.

SUMMARY OF THE INVENTION

This invention is based on the understanding that only if an operator at a feed station drops the postal items himself into the cassettes, an optimum mail handling result may be expected. Thus one feature of the invention consists in providing the cassettes and the main conveyor with means which co-operate for removing cassettes from the main conveyor before they pass the feed station and for re-inserting them into the main conveyor after they have been fed the postal items and passed the feed station.

In this device the cassettes need no more be accessible at the top when attached to the now main conveyor, so that they can hang on the main conveyor by the middle of their top edges and not only at their ends. Thus the main conveyor can consist of one chain or cable, so that a considerable economy of travelling rollers and guiding tracks can be achieved. Furthermore, the cassettes can stand still when being loaded, so that the loading device need not meet strict requirements.

In a preferred embodiment the cassette is provided with a widened open top with outwardly projecting parallel flange edges which can co-operate with a cassette carrier mounted at right angles to and clamped on the conveyor, which carrier is capable of engaging said flange edge for holding the cassettes. The conveyor may include rails for guiding the carriers, and its endless cable may be driven by one or more driving mechanisms co-operating with the carriers clamped thereto.

The means for removing cassettes from the main conveyor may comprise an endless belt or chain coupled to and at an angle with said conveyor and provided with catches capable of withdrawing an empty cassette from the main conveyor and placing it on a belt conveyor also, coupled and moving at the same speed as and running parallel to the main conveyor. This belt conveyor at its end leads to a cross belt which transfers the cassette to a feed station. The feed station is preferably so arranged that the cross-belt ends under a table provided with an aperture. A transport mechanism such as worms move a cassette sideways step-by-step past the aperture and place it on a second cross-belt, which moves the cassette back towards the main conveyor. The table is provided with a keyboard into which an operator punches a code for controlling, through a processor store, the discharge of that cassette into which the operator has dropped a postal item through said aperture.

The means for re-inserting cassettes into the main conveyor comprises a second belt conveyor placed between the second cross-belt and the main conveyor, running parallel to the main conveyor and capable of being coupled with it, and to which second belt conveyor some cassette conveying troughs can be coupled separately. A slanting guiding device for sliding the cassettes back into the carriers on the main conveyor is mounted over this second belt conveyor.

The device according to the invention is particularly suited for handling postal items having widely different dimensions.

Postal items satisfying the specifications of the Universal Postal Union (UPU), which can be handled fully automatically, can e.g. be shot laterally into empty cassettes in the main conveyor by a separate automatic feeding device. For this purpose the cassettes have an aperture in one narrow side or end. This automatic feeding device separates the UPU postal items and moves them passed a reader which automatically sets up the code for their dispatch in the processor store. Then switches switch these items into one of three different channels, one for items which cannot be read, and the other two channels for shooting the properly read items directly into the open ends of empty cassettes along the main conveyor as it continuously moves by this automatic feeding device.

The bottom of each cassette has a hinged door that slopes downwardly towards a catch along the openable side of the door. This door is automatically opened above the discharged container corresponding to the code placed in the processor store from its feeding station. There may be provided separate containers at the discharge station for that code for the automatically fed items from those of the manually fed items, in that the latter are usually larger and more varied in shape and in size. After the cassette has been discharged there may be provided means along the main conveyor for re-closing their bottom hinged doors before they pass any feeding station.

Accordingly, it is an object of this invention to provide a simple, efficient, effective, economic and fast conveyor system for the code sorting of postal items or articles.

It is another object of this invention to provide a device capable of handling a wide variety of postal items from post cards to the largest articles that can be delivered into letter boxes, namely articles measuring 38 × 26.5 × 3.3 cm.

BRIEF DESCRIPTION OF THE VIEWS

The above mentioned and other features, objects and advantages, and a manner of obtaining them are described more specifically below by reference to an embodiment of this invention shown in the accompanying drawings wherein.

Figure 4:
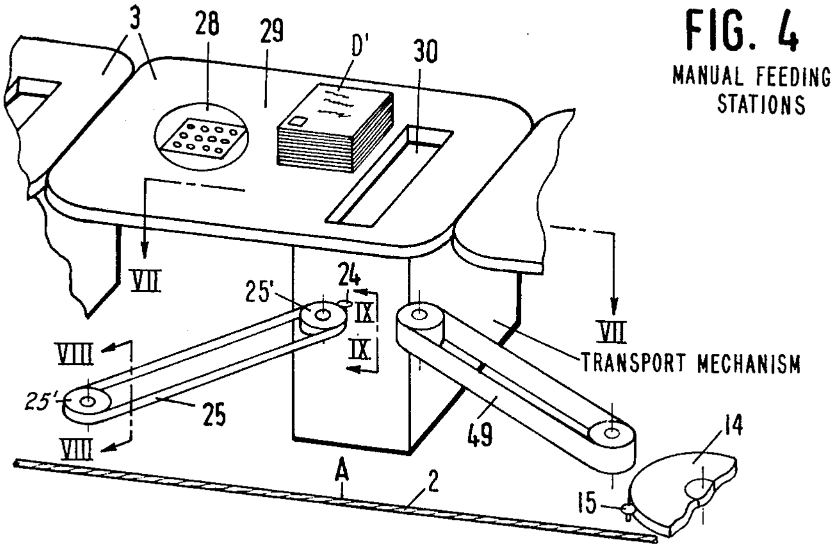
FIG. 4 is a schematic perspective view of one of a plurality of manual feeding stations showing an operator's table with a keyboard, postal items, and aperture therein, and schematically part of the removing and reinserting means to and from the transport mechanism for the cassettes from the main conveyor cable, as well as a small part of a driving unit for the cable.
Figure 7:
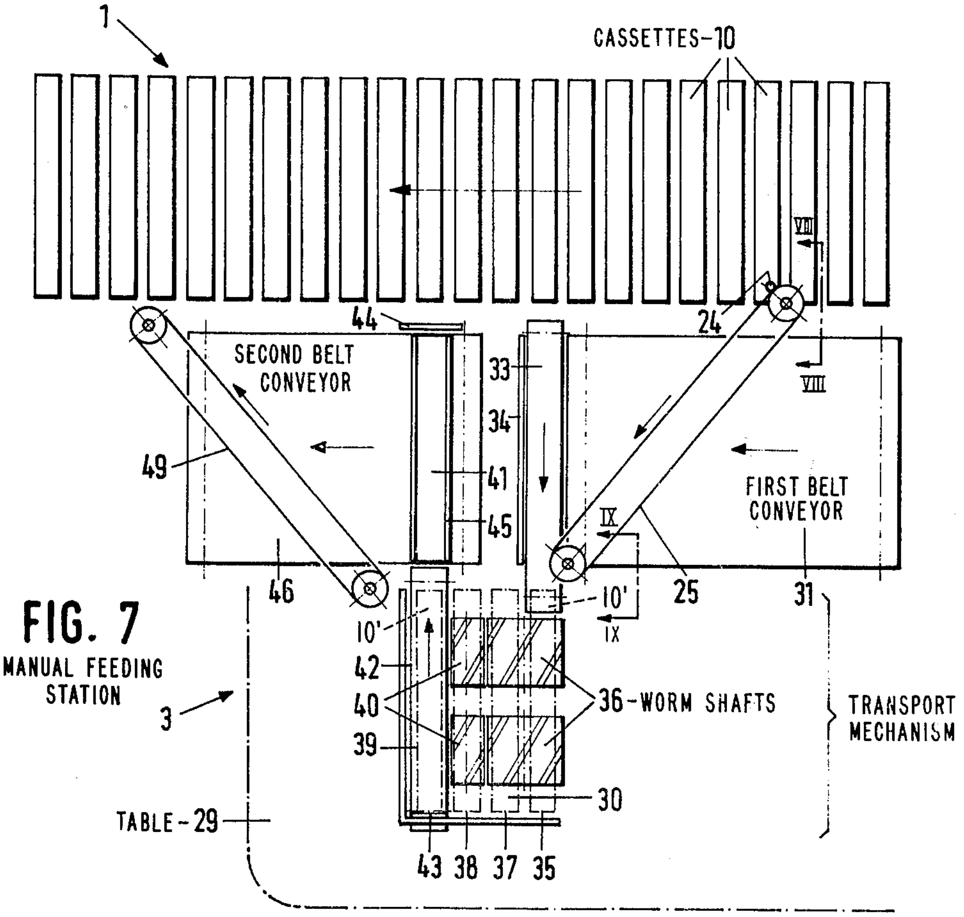
FIG. 7 is a schematic plan view of one manual feeding station taken along line VII—VII below the table top in FIG. 4 and showing the cassette removal belt conveyors at the right, the stepping conveyors of the transport mechanism under the aperture in the table, and at the left the re-inserting belt conveyors for feeding a cassette back into its holder along the main conveyor.
Figure 8:
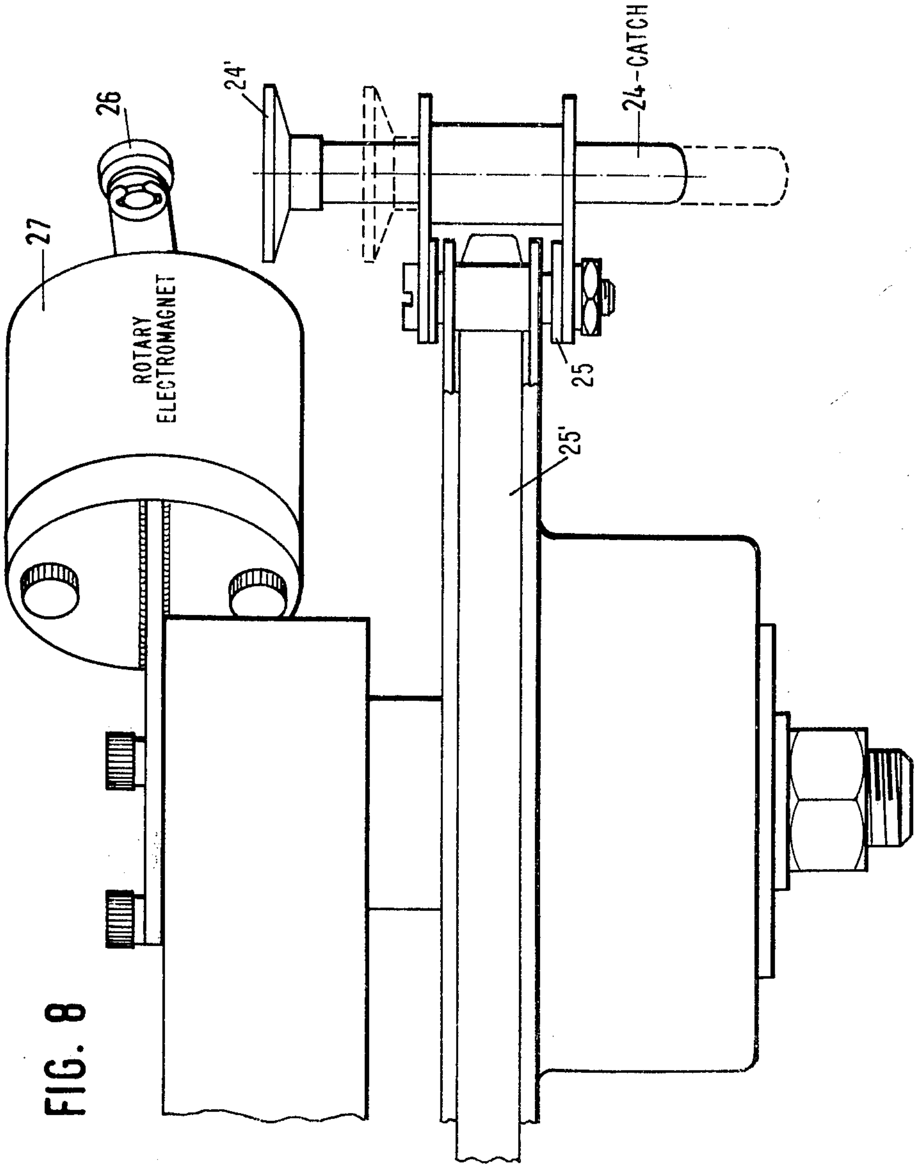
FIG. 8 is an enlarged side elevation of one end of the cassette removing device taken along line VIII—VIII of FIGS. 4 and 7 and showing the catch setting means.
Figure 9:
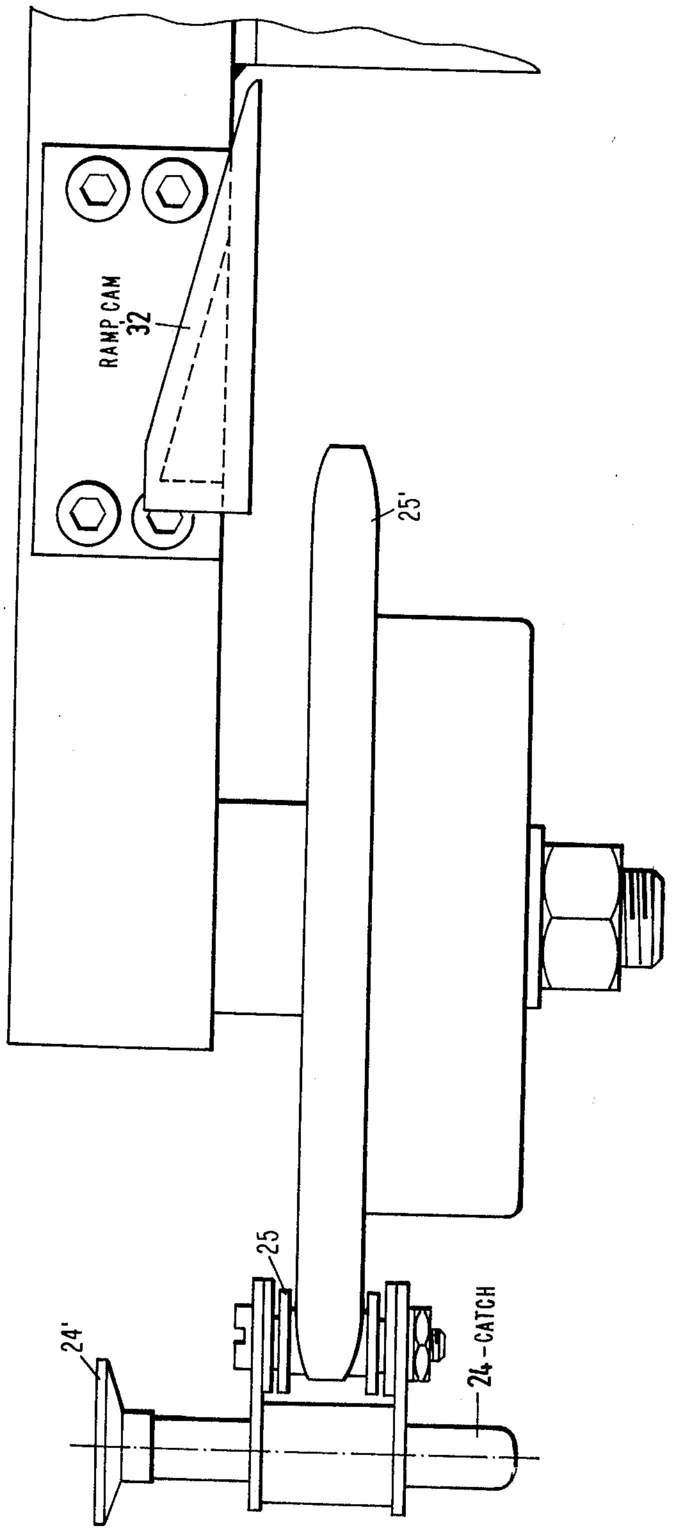
FIG. 9 is an enlarged side elevation of the other end of the cassette removing device taken along line IX—IX of FIGS. 4 and 7 showing the catch resetting means.
Figure 10:
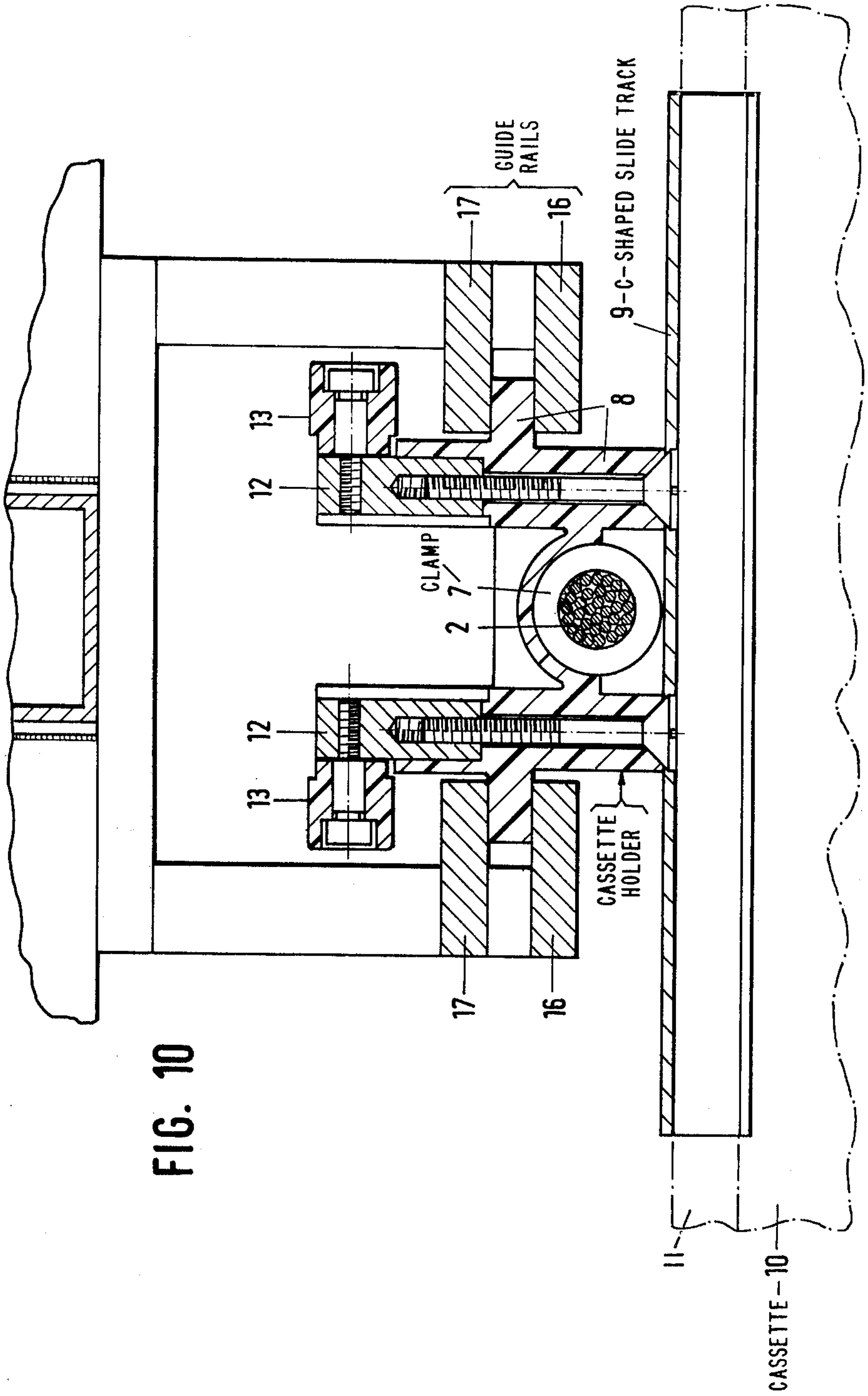
FIG. 10 is an enlarged vertical section through a cassette carrier clamp taken along line X—X of FIGS. 2 and 11, showing the holder for the cassette, its clamp to the cable, and means for guiding the holder along guide rails.
Figure 13:
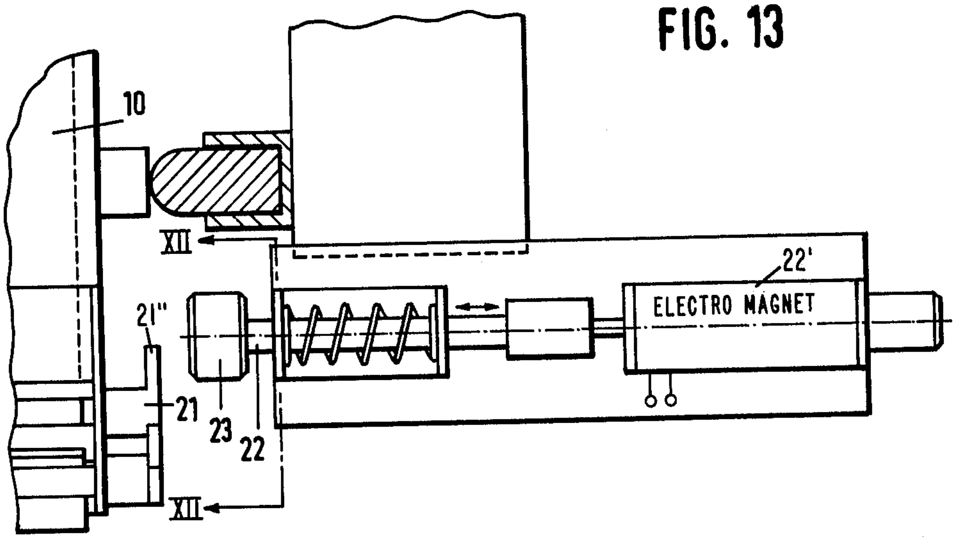
Figures 12A, 12B, 12C:
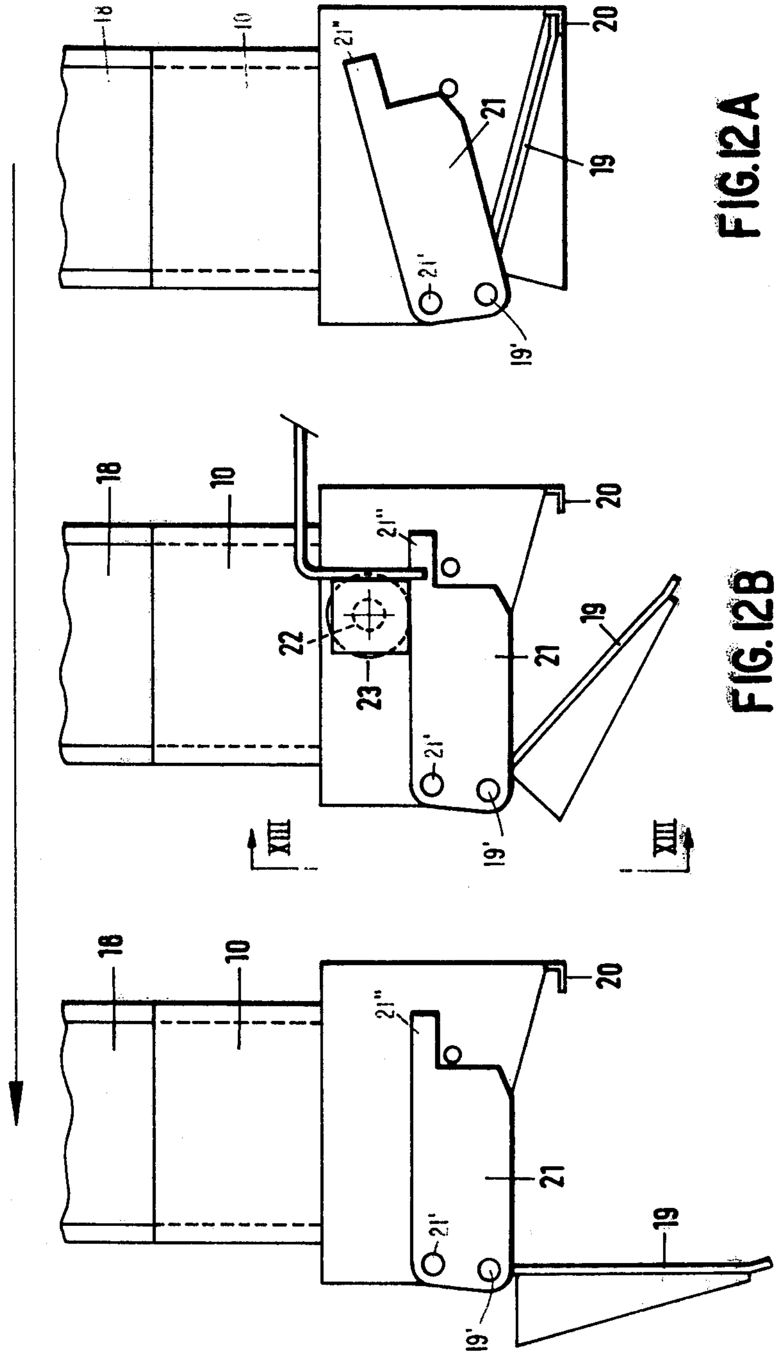
Figure 17:
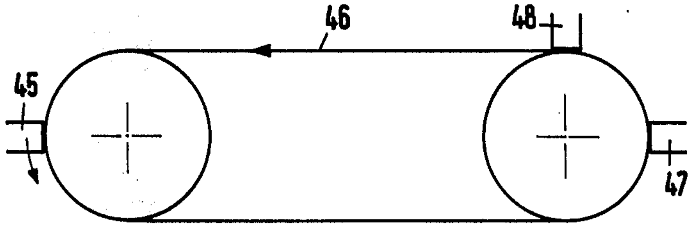
Figure 18:
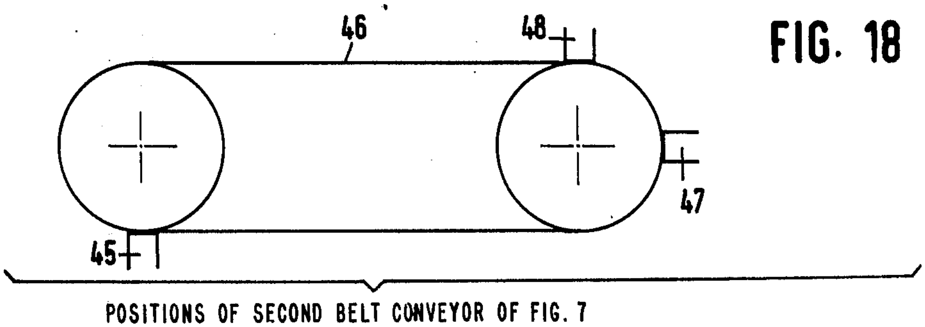
Figure 19:
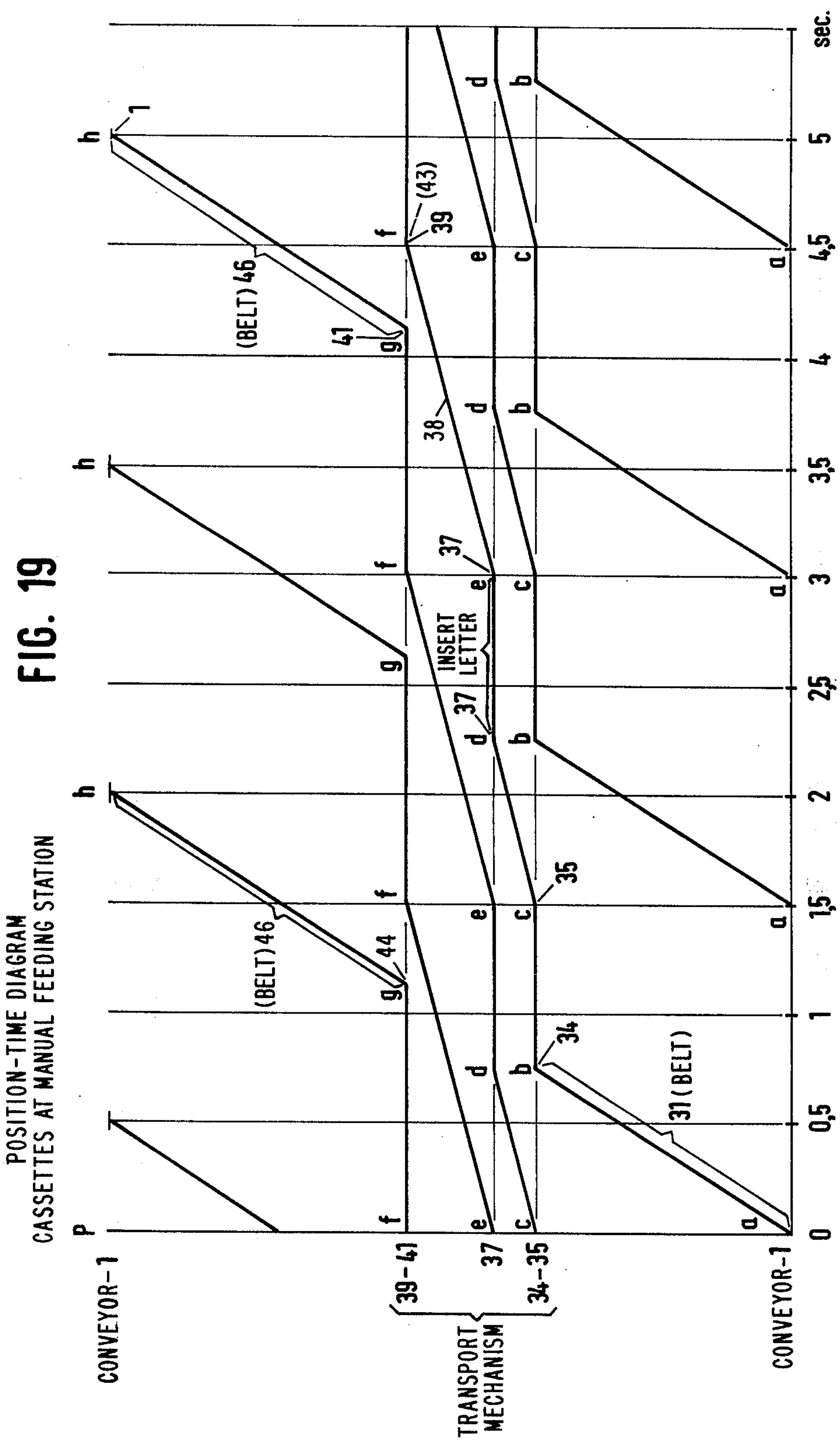

FIGS. 12A thru 12C are an enlarged side elevation of three successive stages of the lower portion of a cassette showing from right to left the closed, the opening, and the opened sloping hinged bottom of cassettes and their latch and lever means as would be seen taken along line XII—XII of FIG. 13;

FIG. 13 is an enlarged view of the actuating mechanism for opening the hinged bottom of cassettes as shown along line XIII—XIII of FIG. 12;

FIGS. 14 through 18 are schematic diagrams of various positions of the three troughs on the second conveyor belt for re-inserting cassettes into the main conveyor at the manual feed station shown in FIGS. 4 and 7; and FIG. 19 is a place time diagram of the motion of the cassettes removed from and reinserted into the main conveyor at a manual feeding station as shown in FIGS. 4, 7 and 14 through 18.

DETAILED DESCRIPTION OF A PREFERRED EMBODIMENT

1. The Main Conveyor (FIGS. 1,2,3,10 and 11)

Figure 1:
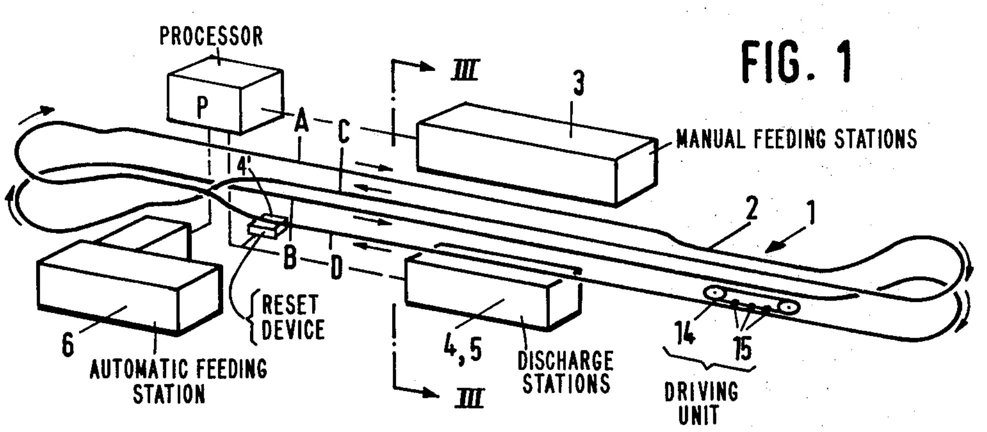
FIG. 1 is a schematic perspective diagram of a main conveyor comprising an endless cable and its associated manual and automatic feeding stations, discharge stations, driving unit, and cassettes closing or reset devices, together with the automatic code processor for controlling the stations.
Figure 2:
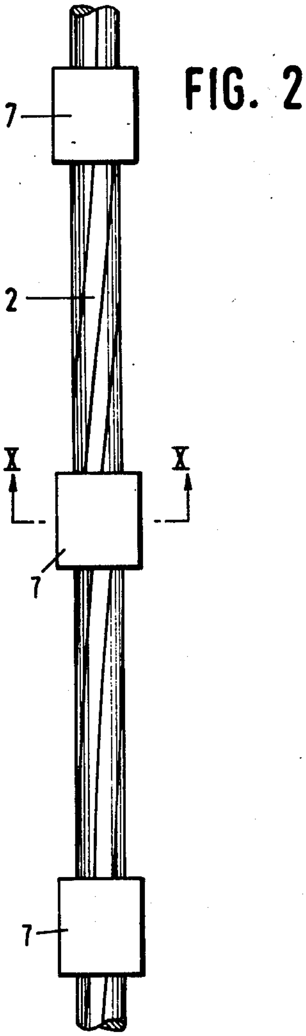
FIG. 2 is an enlarged part of the endless cable shown in FIG. 1 with cassette carrier clamps shown thereon.

FIG. 1 shows a main conveyor 1 comprising an endless cable 2 see also (FIG. 2). The main conveyor 1 may comprise four parallel sections A, B, C and D. A number of feed stations 3 are placed along section A (see also FIG. 4). Discharge stations in the shape of receptacles 4, 5 (see FIG. 6) can be placed under all sections, as can be seen from FIG. 3. An automatic loading station 6 also may be provided for UPU mail (see also FIG. 5).

The cable 2 is provided with a clamp 7 for each carrier or cassette holder 8 (see FIGS. 2, 10 and 11), which holder 8 has a special opening into which the clamp 7 fits without play. The cassette holders 8 are placed at right angles or radially to the cable 2. At the bottom, these holders 8 are provided with a C-shaped cross-section profile 9 for tracks, into which tracks cassettes 10 can be slid, and be held by their outwardly extending or widened top edge flanges 11. The top of these cassette holders 8 may have two projections 12 provided with guide roller 13 (see FIGS. 10 and 11).

The cable 2 driven at one or more places by driving units consisting of an endless chain 14 (FIG. 1) and rollers 15 which co-operate with the projections 12. These projections 12 further ensure the cassette holders against excessive transverse play with respect to the main conveyor 1. This guiding of the holders or carriers 8 is of importance at the discharging stations 4, 5, the driving units 14, the points in the feeding station 3 where cassettes are slid out of or into the carriers at the automatic feeding station 6, at 4' where the bottoms of cassettes are shut (see below), and at some slopes and bends of the main conveyor 1. In the straight horizontal parts, the cable 2 of the main conveyor 1 may be guided by rails 16 and 17 (FIGS. 10 and 11) slidably engaged by flanges on the cassette holders 8. In the bends some fixed rollers, not shown in the figures, ensure low friction. The guide rollers 13 may engage rails (not shown) provided along the sloping parts of the main conveyor, where there is no lower rail 16.

2. The Cassettes and Their Discharge (FIGS. 6, 7, 10–13)

The cassettes 10 have such dimensions that they can hold the largest postal items that can be delivered into letter-boxes, i.e. those measuring 38 × 26.5 × 3.3 cm. The UPU mail or items D, however, of more limited dimensions can be fed into the cassettes by automatically a loading station 6 (FIGS. 1, 5) through an aperture 18 (see FIGS. 6, 11, 12 ) in one of the narrow sides or ends of the cassettes 10. The other and larger postal items or articles D' (see FIG. 4) are inserted from above into the open tops of the cassettes 10. All postal items D and D' are discharged from the cassettes 10 via a bottom flap 19 or hinged door (FIG. 12). The bottom flap 19 is hinged at pivot 19' along one of its longer edges and is secured against falling open at the opposite edge by two fixed stops or catches 20. Furthermore the hinged edge of the flap 19 is located above the locked edge at 20 to provide a sloping bottom for the cassette 10. Owing to this slope, especially the thin items are bound to take a favourable position for being dropped quickly and perpendicularly when the flap 19 is opened. In order that the bottom flap 19 can be opened it has to be moved sideways against the action of two drawn-springs (not shown) so as to disengage itself from the stops 20; only then can the flap 19 swing open by its own weight. This lateral movement is possible because the bottom flap is hinged at 21' to two coupled short levers 21, one at each end of each cassette at least one of which has such an extension 21 that during the passage of a cassette by its predetermined coded discharge station, an electro-magnetically 22 controlled pin 22 fixed to the main conveyor actuates the extended lever 21 by means of a roller 23, thus opening the flap 19 (FIGS. 12, 13). The flap 19 is closed when passing by two studs (not shown), at a station 4. One stud move the flap 19 upwards and the other locks it. Since the location of such an automatically operating flap shutting device 4' is not very important, any favourable place therefor can be chosen along the main conveyor.

Figure 3:
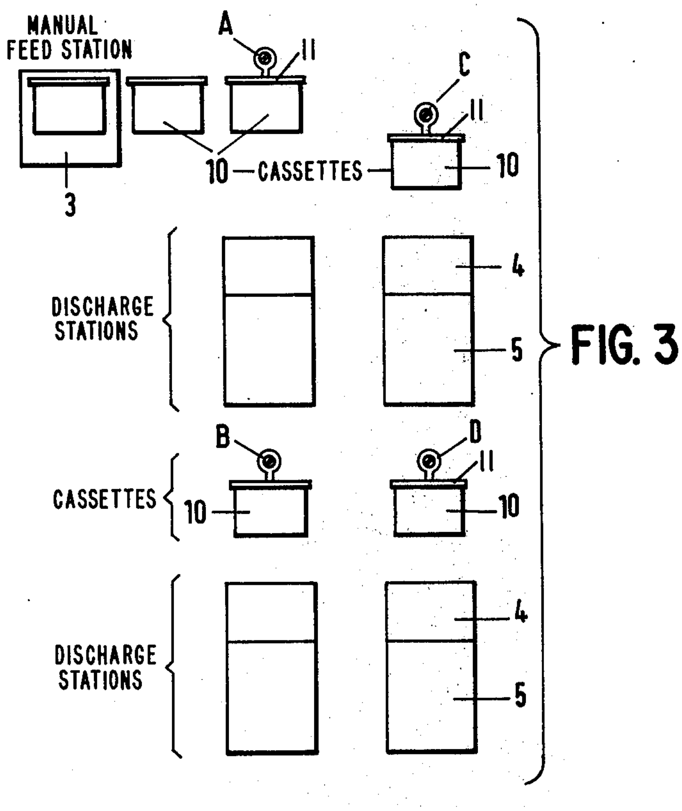
FIG. 3 is an enlarged schematic cross-section taken along line III—III in FIG. 1 showing the locations of the four reaches of the main conveyor cable with its depending cassettes in relation to manual feeding station and four discharge stations.
Figure 6:
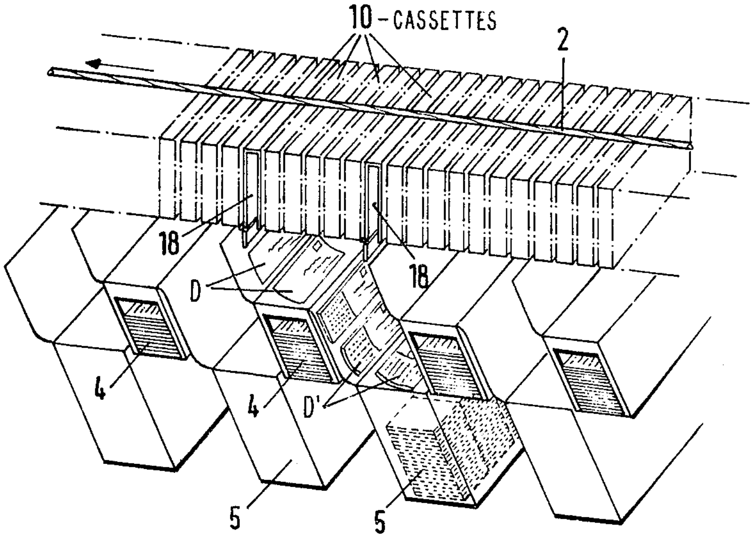
FIG. 6 is a schematic perspective view of several discharge receptacles of the discharge stations in relationship to the cassettes carried by the main conveyor cable.

Under each place where the bottom flaps of the cassettes are opened there is a receptacle 4 for UPU-mail or a receptacle 5 for other postal items D (FIG. 6). A battery of receptacles constitute together the discharge station 4, 5 (FIGS. 1, 3).

3. The Manual Feeding Stations (FIGS. 4, 7, 8, 9, and 14 to 19).

At the manual feed stations 3 the empty cassettes 10 are removed from the main conveyor 1 by means of an endless belt or sprocket chain 25 around space to 25 provided with catches 24 (FIGS. 4, 7, 8, 9). The catches 24 can take two positions. In FIG. 8a catch 24 is shown in full line in its higher disengaging position. These catches 24 may be pushed into their lower cassette engaging dotted line position by the arm 26 of a stationary rotary magnet 27 which arm 26 is located over the conveyor 1. When there is an empty cassette under a catch 24, the arm 26 can push the catch 24 into it. This is done under the control of the processor P (see FIG. 1) and initiated by an operator, who, at the feed station 3, operates a keyboard 28 mounted on a table 29 provided with an aperture 30 (FIG. 4). When the operator has struck a final key, the processor P indicates the empty cassette in the conveyor 1 which is to receive the postal item D'. If no empty cassette is available, the belt 25 waits till there is one. At that moment the catch 24 is pushed into the open top of the passing cassette 10. At the same time the belt or chain 25 starts running in synchronism with the main conveyor 1, pulling the cassette 10' out of this conveyor 1 on to a continuously running belt conveyor 31, which moves at the same speed as and is parallel to the main conveyor 1 (FIG. 7). When the cassette 10' has entirely been withdrawn from between the other cassettes 10 on conveyor 1, the catch 24 is pushed upwards by a stationary ramp 32 (FIG. 9), engaging the flanged top 24' of catch 24, then the belt or chain 25 is stopped. At the end of the belt conveyor 31, the cassette is slid on to a transverse belt 33, its movement parallel to the conveyor 1 being checked by a stop plate 34. The transverse belt 33 moves the cassette 10' to a waiting position 35, where it rests on a transport mechanism consisting of two worm shafts 36 under the table 29 (FIGS. 7, 4). When the final key in keyboard 28 is pressed, and if there is an empty cassette in the position in front of the belt or chain 25, the worm shafts 36 move the cassette 10' waiting at 35 to the adjacent position 37 right under the aperture 30, by making one revolution. The worm shafts 36 are driven via *n* complete revolution couplings, which are not shown.

After the operator has struck the code, in keyboard 28, inserted or dropped a letter D' into aperture 30, and pressed the final key, and if there is an empty cassette in a position in front of the belt or chain 25, the cassette 10' is moved via position 38 to position 39, by the worm shafts 40, making two revolutions, and taking over the cassette 10' from the worm shafts 36. The reason for this arrangement is that otherwise there would be too little space between the stop plate 34 and the fitting of the belt conveyor 46. Then the loaded cassette 10' is moved from position 39 to position 41 by means of a second transverse belt 42 (FIG. 7) provided with two cassette pushing cleats or projections 43. In the position 41 the cassette 10' movement is checked by a stop-plate 44. The cassette 10' is now in a trough 45 on a second belt conveyor 46 (see also FIGS. 14–18), which belt 46 has three troughs (45, 47 and 48). This second belt conveyor 46 takes the cassette 10' with letter D' back to the main conveyor 1 by means of a guiding device 49, which is placed at an angle and can be formed by a conveyor belt. When a cassette has been withdrawn from the main conveyor 1, another cassette can be inserted into its empty place. To this end the belt conveyor 46 has to be started at a suitable moment, if a loaded cassette is in one of the troughs 45, 47 or 48 in position 41. The belt conveyor 46 moves in synchronism with the conveyor 1.

The troughs 45, 47 or 48 can stand still or be taken along by the belt conveyor 46 as controlled by the processor P by means of studs — not shown — that can take two positions.

Figure 14:
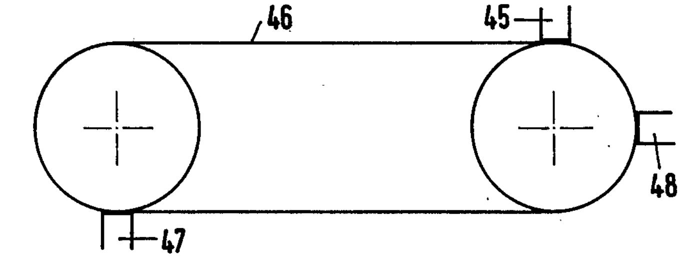
Figure 15:
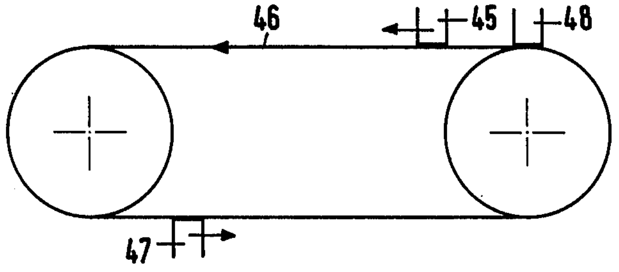
Figure 16:
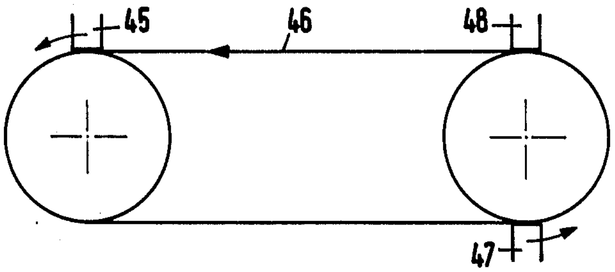

FIGS. 14 – 18 represent a complete cycle in which the following states occur successively:

| | belt conveyor 46 | trough 45 | trough 47 | trough 48 |
|---|---|---|---|---|
| FIG. 14 | stationary | stationary | stationary | stationary |
| FIG. 15 | moving | taken along | taken along | after start stops in position shown |
| FIG. 16 | moving | taken along | taken along | stationary |
| FIG. 17 | moving | taken along | stops in position shown | stationary |
| FIG. 18 | stationary | stationary | stationary | stationary |

FIG. 19 is a time diagram of cassette travel in the direction (*y*-axis) parallel to the main conveyor 1.

Line segments *a-b* represent the time between the moment when a cassette starts moving lengthwise out the main conveyor 1 over the belt conveyor 31 to the moment when it reaches the stop-plate 34.

Line segments *b-c:* the subsequent time to move from plate 34 to the waiting position 35.

Line segments *c-d:* the subsequent time to reach position 37 under the aperture 30.

Line segments *d-e:* the minimum time available for inserting a letter.

Line segments *e-f:* the subsequent time to reach position 39 via position 38.

Line segments *f-g:* the subsequent time to reach position 41 against the stop-plate 44.

Line segments *g-h:* the time to occupy a position in the main conveyor 1 again over the second belt conveyor 46.

As seen from this diagram in FIG. 19, the prolongation of each line segment *a-b* has a line segment *g-h*, so that a loaded cassette can always occupy an empty position in the main conveyor.

However, the operators are not tied down to the strict schema of FIG. 19. When no work is done, cassettes are not withdrawn from the main conveyor nor inserted into it. If a cassette has been withdrawn, it can be held up in one of the positions 35, 37 and 39. A trough 45, 47, or 48 on belt conveyor 46, however, always travels beside an open place for a cassette in the main conveyor 1. Loaded cassettes in position 37 or 39 (e.g. at the end of the service) are moved on after some time under the control of the processor P, without intervention of an operator.

4. The Automatic Feeding Station (FIG. 5)

In addition to the handling of mail at a manual feed station 3, there is provided an automatic mail handling at a loading station 6 which shows a device for electronic reading of code marks on letters.

Figure 5:
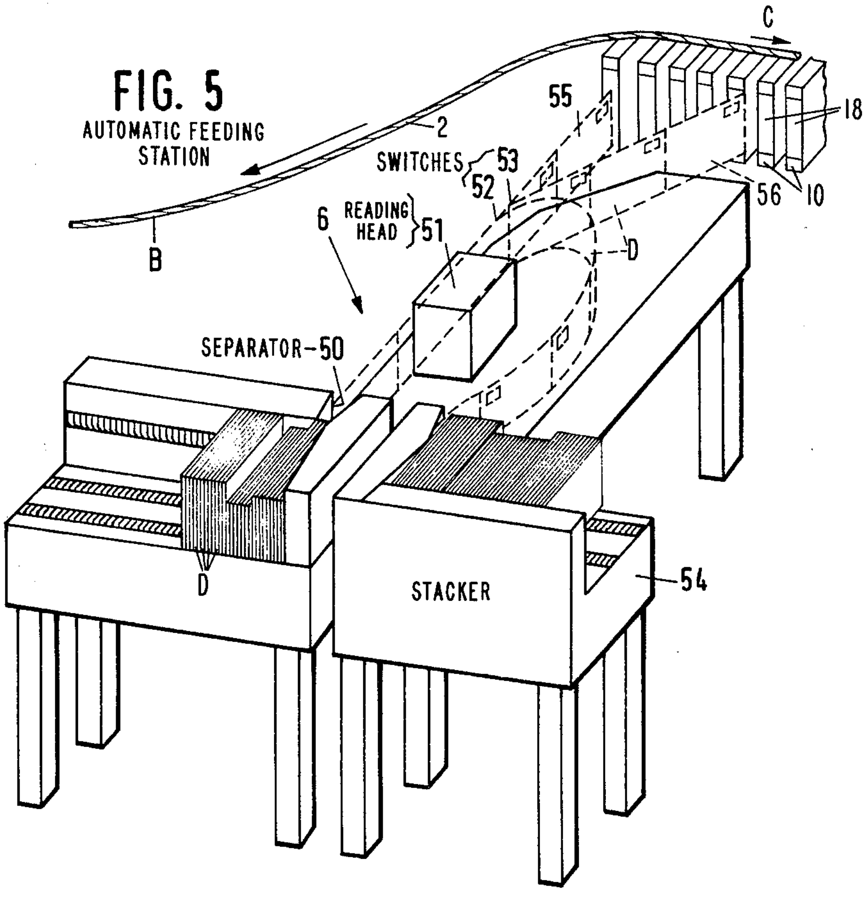
FIG. 5 is a schematic perspective view of an automatic feeding station of UPU mail showing in dotted lines the separation, reading, stacking, and shooting of the postal items into the open ends of cassettes along the main cable conveyor.
Figure 11:
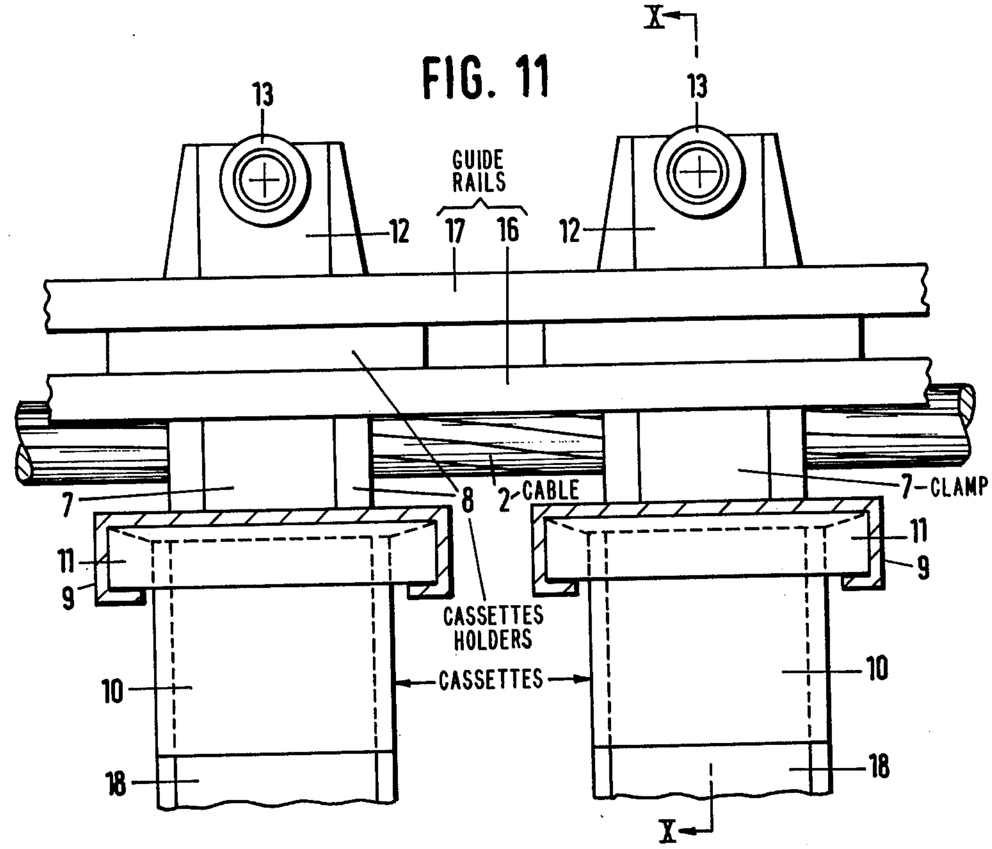
FIG. 11 is an enlarged side elevation of a pair of cassette holders holding the upper portions of cassettes as seen from the right of FIG. 10.

A separator 50 carries the letters D to an automatic feed station, where a reading head 51 reads the index code and subsequently shoots the letters at a rate of 30,000 letters an hour into the open sides 18 of the cassettes 10 (FIGS. 1, 5, 11). For this function to be carried out correctly, the reading head 51 is immediately followed by two switches 52, 53. The former switch 52 moves the letters that present no recognizable code to a stacker 54. The latter switch 53 sends the letter D alternately into two channels 55, 56, each of which is pointed at a separate cassette for a sufficiently long time to lodge even the longest letter safely in that cassette. The information read by the reading head 51 is passed to the processor P and in this case too the cassette releases the letter at its destination with the aid of a counting system. At this UPU mail may be subjected to another treatment than the other mail, this former, handled via the automatic feed station 6 is discharged into separate receptacles 4 at the discharge stations (FIG. 6), which form part of combined receptacles 4, 5. The receptacles 5 are for the larger postal articles D' for the same destinations (FIG. 6).

As has been described in what precedes, the cassettes are loaded at manual feed stations 3 as well as at automatic feed stations 6. If the machine has a handling capacity of 30,000 cassettes/hour (conveyor speed 63.5 cm/sec.), a separator 50 allowing an automatic feed rate of equal to 30,000 letters/hour will suffice.

By half way around its circuit, the main conveyor will have dropped the contents of quite a few cassettes into the receptacles of destination. These emptied cassettes can be used: at a second automatic feed station which may comprise a second separator delivering letters into the empty cassettes, or at some manual feeding stations. Thus the handling capacity of the machine can theoretically be increased tc 40,000 letters/hour. Then again by adding further feed stations, this number can be increased to a theoretic maximum of twice the conveyor capacity, i.e. to 60,000 letters/hour.

While there is described above the principles of this invention in connection with specific apparatus, it is to be clearly understood that this description is made only by way of example and not as a limitation to the scope of the invention.

what is claimed is:

1. A device for code sorting postal items, comprising:

A. an endless cable main conveyor,

B. carriers mounted at right angles to and on said main conveyor cable,

C. rails along said main conveyor for guiding said carriers,

D. at least one means for engaging said carriers for driving said cable,

E. a plurality of cassettes having wide top edges for cooperating with and being removably mounted in said carriers, said cassettes being mounted at right angles to the direction of movement of said main conveyor, and each cassette being capable of transporting one postal item in an upright position, F. at least one feeding station along said main conveyor where postal items are fed to said cassettes, G. means at said feeding station for transferring and recording in a processor coded information relative to the destination of said postal items, H. a plurality of discharged positions along said main conveyor into which postal items are discharged from said cassettes in accordance with the coded information recorded in said processor, I. endless belt means coupled to said main conveyor for removing cassettes from said main conveyor before they pass said feeding station, said endless belt means having catches engageable with an empty cassette for withdrawing it from said main conveyor, and J. a second belt conveyor also coupled to said main conveyor and running parallel to it at the same speed of said main conveyor for supporting a removed cassette and moving it toward said feeding station.

2. A device according to claim 1 including:

K. a cross belt to said second belt conveyor for further moving said removed cassette toward said feeding station.

3. A device according to claim 2 wherein said feeding station comprises:

L. A table provided with an aperture,

M. a transport mechanism for moving the removed cassette sideways step by step passed and under said aperture, and N. a second cross belt for receiving said cassette from said step by step transport mechanism for moving said cassette back towards said main conveyor.

4. A device according to claim 3 wherein said step by step transport mechanism comprises:

O. worm shafts, and

P. at least one n-complete-revolution coupling to said worm shafts for determining the length of the steps of said transport mechanism.

5. A device according to claim 4 including:

Q. means for reinserting cassettes into said carriers on said main conveyor comprising a third belt conveyor between said second cross belt and said main conveyor, said third belt conveyor running parallel and coupled to said main conveyor and having:

R. a plurality of cassette conveying troughs separately coupled to said third belt for receiving said cassettes from said second cross belt, and S. a slanting guiding device mounted over the said third conveyor belt for sliding cassettes from said troughs back into said carriers on said main conveyor.

* * * * *

UNITED STATES PATENT OFFICE
CERTIFICATE OF CORRECTION

Patent No. 4,008,813 Dated February 22, 1977

Inventor(s) Carolus Pieter Leersnijder

It is certified that error appears in the above-identified patent and that said Letters Patent are hereby corrected as shown below:

Page 1, line 3 of the Abstract, cancel "main"; line 4 of the Abstract, change "conveyor coded" to - - conveyor. Coded - -; line 12 of the Abstract, cancel "is". Column 1, line 6, cancel "the"; line 16, change "cassette" to - - cassettes - -; line 39, cancel "now"; line 40, after "that" insert - - now - -.
Column 4, line 25, before "driven" insert - - may be - -; line 50, cancel "by"; line 51, after "cally" insert - - by - -; line 57, cancel "19"; line 57, after "door" insert - - 19 - -. Column 5, line 5, change "21" to - - 21" - -; line 7, change "22" to - - 22' - -; line 9, change "21" to - - 21" - -; line 11, change "4" to - - 4' - -; line 18, after "mail" insert - - D - -; line 19, change "D" to - - D' - -; line 26, change "space to 25" to - - sprockets 25' - -; line 65, after "cassette" insert - - 10' - -. Column 6, line 58, after "out" insert - - of - -. Column 7, line 56, after "conveyor" insert - - 1, however, - -.

Signed and Sealed this

Twenty-first Day of June 1977

[SEAL]

*Attest:*

RUTH C. MASON
*Attesting Officer*

C. MARSHALL DANN
*Commissioner of Patents and Trademarks*